United States Patent
Lacroix et al.

(10) Patent No.: US 10,337,456 B2
(45) Date of Patent: Jul. 2, 2019

(54) INTERMEDIATE CASING HUB FOR AN AIRCRAFT TURBOJET ENGINE INCLUDING A COMPOSITE OUTLET PIPE

(71) Applicants: Safran Aircraft Engines, Paris (FR); Safran, Paris (FR)

(72) Inventors: Florian Benjamin Kévin Lacroix, Moissy-Cramayel (FR); Cyrille François Antoine Mathias, Livry Gargan (FR); Idaline Françoise Chantal Texier, Paris (FR); Maxime Marie Désirée Blaise, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 93 days.

(21) Appl. No.: 15/573,970

(22) PCT Filed: May 13, 2016

(86) PCT No.: PCT/FR2016/051134
§ 371 (c)(1),
(2) Date: Nov. 14, 2017

(87) PCT Pub. No.: WO2016/185119
PCT Pub. Date: Nov. 24, 2016

(65) Prior Publication Data
US 2018/0291841 A1  Oct. 11, 2018

(30) Foreign Application Priority Data
May 15, 2015 (FR) ..................... 15 54378

(51) Int. Cl.
*F02C 9/18* (2006.01)
*F02K 3/075* (2006.01)

(52) U.S. Cl.
CPC ............ *F02K 3/075* (2013.01); *F02C 9/18* (2013.01); *F05D 2220/323* (2013.01);
(Continued)

(58) Field of Classification Search
CPC .. F02K 3/075; F02C 3/10; F02C 7/052; F02C 6/08; F02C 9/18; F04D 27/0207;
(Continued)

(56) References Cited

U.S. PATENT DOCUMENTS 6,086,326 A * 7/2000 Honda .............. F01D 17/00
415/126
7,624,581 B2 * 12/2009 Moniz .............. F01D 17/105
60/226.1
(Continued)

FOREIGN PATENT DOCUMENTS

EP 1 854 989 A2 11/2007
EP 2 383 453 A2 11/2011
(Continued)

OTHER PUBLICATIONS

Search Report issued in French Patent Application No. 15 54378 dated Mar. 15, 2016.
(Continued)

*Primary Examiner* — Carlos A Rivera
*Assistant Examiner* — Sang K Kim
(74) *Attorney, Agent, or Firm* — Pearne & Gordon LLP

(57) ABSTRACT

The invention relates to an intermediate casing hub of an aircraft turbojet engine, which includes: an outer shroud (14) intended for defining a secondary flow space of a stream of secondary gas on the inside and an inter-flow area on the outside, the outer shroud (14) being provided with a secondary opening (29), and a bleed valve comprising an outlet pipe (30) made of composite material, located in the inter-flow area, wherein the outlet pipe (30) is attached to the outer shroud (14) at the secondary opening (29), at least one gasket (33) for sealing against air and fire being arranged between the outlet pipe (30) and the outer shroud (14), and the outlet pipe (30) made of composite material includes a draped composite wall (30a, 30b), made up of a plurality of folds impregnated with resin.

13 Claims, 4 Drawing Sheets

(52) U.S. Cl.
CPC ...... *F05D 2240/14* (2013.01); *F05D 2240/55* (2013.01); *F05D 2260/30* (2013.01); *F05D 2300/437* (2013.01); *F05D 2300/603* (2013.01); *Y02T 50/672* (2013.01)

(58) Field of Classification Search
CPC ........... F04D 27/0215; F05D 2220/323; F05D 2240/14; F05D 2240/55; F05D 2260/30; F05D 2300/437; F05D 2300/603
See application file for complete search history.

(56) References Cited

U.S. PATENT DOCUMENTS

| | | | |
|---|---|---|---|
| 7,918,081 B2* | 4/2011 | Schlichting | F02C 6/08 169/48 |
| 9,476,362 B2* | 10/2016 | Patsouris | F01D 9/065 |
| 9,982,598 B2* | 5/2018 | Pritchard, Jr. | F02K 3/075 |
| 2013/0269366 A1* | 10/2013 | Haugen | F02C 6/08 60/783 |
| 2013/0340441 A1* | 12/2013 | Little | F02C 9/18 60/785 |
| 2017/0298775 A1 | 10/2017 | Mathias | |
| 2018/0266263 A1* | 9/2018 | Jacon | F01D 11/005 |
| 2019/0055889 A1* | 2/2019 | Heims | F02C 6/08 |

FOREIGN PATENT DOCUMENTS

| | | |
|---|---|---|
| FR | 2 961 251 A1 | 12/2011 |
| FR | 3 012 846 A1 | 5/2015 |

OTHER PUBLICATIONS

International Search Report issued in Application No. PCT/FR2016/051134 dated Aug. 10, 2016.
Written Opinion issued in Application No. PCT/FR2016/051134 dated Aug. 10, 2016.

* cited by examiner

INTERMEDIATE CASING HUB FOR AN AIRCRAFT TURBOJET ENGINE INCLUDING A COMPOSITE OUTLET PIPE

TECHNICAL DOMAIN

This invention relates to the domain of aircraft turbojet engines, and more particularly to the general field of twin-flow twin-spool turbojet engines.

The invention also relates to an intermediate casing hub for an aircraft turbojet engine, particularly of the type comprising at least two mechanically independent twin spools.

In a twin-spool turbojet engine, the term "intermediate casing" is usually used to denote a casing for which the hub is located between a low-pressure compressor casing and a high-pressure compressor casing.

This invention relates more particularly to an intermediate casing hub of the type comprising Variable Bleed Valves (VBV).

The variable bleed valves are designed solely to adjust the inlet flow to the high-pressure compressor, particularly so as to limit risks of hunting in the low-pressure compressor, allowing evacuation of some of the air outside the annular flow space of the core engine flow.

Furthermore, if any water, particularly in the form of rain or hail, or miscellaneous debris that could harm operation of the turbojet engine, accidentally penetrates into this flow space, these variable bleed valves can recover this water or this debris that is centrifuged in the above-mentioned flow space to be ejected to the exterior.

In the case of twin-spool turbojet engines, these variable bleed valves are configured to enable the passage of air, water or debris from the core engine flow space to an annular fan flow space. To achieve this, the variable bleed valves comprise in particular, core engine flow outlet pipes to the fan flow, connecting orifices communicating with the core engine flow and the fan flow respectively.

Thus, and more precisely, the invention relates to an intermediate casing hub for an aircraft turbojet engine comprising a gasket for sealing against air and fire at an outlet pipe provided with a composite wall draped with a plurality of plies impregnated with a resin, an intermediate casing comprising such a hub, and an aircraft turbojet engine comprising such an intermediate casing.

STATE OF THE PRIOR ART

Composite materials are being used increasingly frequently in the field of aircraft turbojet engines. In particular, many aeronautical parts are now made at least partly from OMC ("Organic Matrix Composite") composite materials.

Thus, it would be possible to envisage making the outlet pipes fitted on the variable bleed valves described above of an intermediate casing hub for an aircraft turbojet engine, from composite materials, and particularly from organic matrix composites (OMCs).

However, composite materials and especially organic matrix composites are particularly sensitive to the risk of fire, because the organic resin forming the matrix is combustible. However, these composite materials are often used in turbojet engine equipment located in zones in which there is a risk of fire.

In particular, the outlet pipes fitted on the variable bleed valves are typically located in a zone with a fire risk, namely the inter-flow stream zone of the turbojet engine, such that all fresh air supply to a fire contained in this zone has to be prevented.

As an illustration of the technical context of the invention, FIG. 1 shows a partial axial sectional view of a hub 10 of an intermediate casing 11 for a known type of aircraft twin-flow twin-spool turbojet engine 12.

The hub 10 of the intermediate casing 11 usually comprises two coaxial annular shrouds, the inner shroud 13 and the outer shroud 14, connected to each other by two cross-plates, namely an upstream cross-plate 15 and a downstream cross-plate 16.

The upstream cross-plate 15 is located downstream from a low-pressure compressor 17 of the turbojet engine 12, while the downstream cross-plate 16 is located upstream from a high-pressure compressor 18 of this turbojet engine 12. This high-pressure compressor 18 generally comprises a sequence of rotors and variable pitch stators to control the air flow passing through it.

Moreover, between the inner shroud 13 and outer shroud 14, and between the upstream cross-wall 15 and the downstream cross-wall 16, there are intermediate spaces 19 distributed around the axis of the hub 10, coincident with the axis of rotation T of the turbojet engine 12. The intermediate spaces 19 are upstream from an inter-flow stream zone ZC.

Furthermore, the inner shroud 13 delimits an annular core engine flow space 20 of a core engine flow of the turbojet engine 12. The inner shroud 13 also comprises air passage orifices 21, called primary orifices in the following, each of which is closed off by the pivoting flap 22 of a corresponding variable bleed valve 23, that will regulate the flow from the high-pressure compressor 18 and possibly evacuation of air, water or debris as explained above.

Such a variable bleed valve 23 is usually in the form of a gate 24, that comprises the pivoting flap 22 at its radially inner end and that is mounted free to pivot about an axis Y such that when the primary orifices 21 are in the closed position, the flap 22 prolongs the inner shroud 13 of the intermediate casing 11 practically continuously to minimise risks of aerodynamic disturbances of the core engine flow through this flap 22, and in the open position of said primary orifices 21, the flap 22 projects radially inwards from the inner shroud 13 and thus forms a scoop for drawing off part of the core engine flow in the space 20. The gate 24 comprises a conduit 25 through which scoop air passes, this conduit 25 terminating on the downstream side on an outlet orifice 26 opening up in the corresponding intermediate space 19. Patent application FR 2 961 251 A1 of the Applicant also describes another example of a variable bleed valve of an intermediate casing hub of an aircraft turbojet engine.

Moreover, the outer shroud 14 delimits an annular fan flow space 27 of a fan flow F2 of the turbojet engine 12, and is connected to structural arms 28, at a relatively large spacing from each other, passing through this space 27. Moreover, the outer shroud 14 comprises air passage orifices 29, called secondary orifices in the following and located downstream from the downstream cross-plate 16. In other words, in this example in FIG. 1, air, water or debris are evacuated through the outer shroud 14.

However, as a variant (not shown), for example when the outer shroud 14 supports guide vanes relatively close to each other, they hinder the above-mentioned evacuation through the outer shroud 14. In this case, it can be desirable to enable this evacuation further downstream through the annular wall of an extension of the hub of the intermediate casing, in other words the annular wall of a structural part that is sometimes used to support thrust inverter elements such as fairing panels at its downstream end.

When variable pitch stators of the high-pressure compressor 18 are in a position that reduces the air flow inlet into this compressor, surplus air in the fan flow space can be evacuated through the secondary orifices 29, thus avoiding hunting phenomena that can cause deterioration or even complete destruction of the low-pressure compressor 17.

Furthermore, as explained above, each of the outlet pipes 30 extends between an inlet orifice 31 opening up into the intermediate space 19 and a corresponding secondary orifice 29. A discharge flow FD output from the core engine flow circulates inside these outlet pipes 30 towards the fan flow F2. The inlet orifice 31 is formed to be generally flush with the surface of the downstream cross-wall 16 opening up into the intermediate space 19. The secondary orifice 29 comprises a control gate 32 fixed to the outlet pipe 32 at its outlet, to be able to control the discharge flow FD when it is released into the fan flow F2.

In each intermediate space 19, the outlet orifice 26 of the primary pipe 25 and the inlet orifice 31 of the outlet pipe 30 are arranged to face each other.

Each gate 24, and the corresponding downstream intermediate space 19 and outlet pipe 30 together form an air, water or debris evacuation system, globally referred to as the "variable bleed valve", from the core engine flow space 20 to the fan flow space 27. Therefore the hub 11 comprises a plurality of such systems distributed about its axis T.

When a gate 24 is in the open position, an air flow scooped by the gate passes through the primary pipe 25, opens up in the intermediate space 19 through its outlet orifice 26, and penetrates into the corresponding outlet pipe 30 until it reaches the fan flow space 27.

As can be seen on FIG. 1, the outlet pipes 30 are fixed firstly to the outer shroud 14, particularly by screws, and secondly to the downstream cross-plate 16. They are located in an inter-flow area ZC of the turbojet engine 12 in which there is a risk of fire, as mentioned above. Such an inter-flow area is frequently qualified as a "core zone".

It is thus found necessary to provide a solution to prevent any supply of fresh air to the inter-flow area ZC of the turbojet engine 12 from the core engine flow or from the fan flow.

PRESENTATION OF THE INVENTION

Consequently, there is a need to propose a solution to improve the reliability and efficiency of the use of an outlet pipe on the variable bleed valve of a hub of an intermediate casing of an aircraft turbojet engine, made from one or several composite materials, in a zone of a turbojet engine with a risk of fire. In particular, there is a need to design one or several interfaces of the composite variable bleed valve with one or several parts of its environment, for example an outer shroud, that are resistant to fire, and particularly sealed against fire according to standard ISO 2685. There is also a need to achieve such air tightness of an interface between an outlet pipe and its environment, even when there is no fire, so that the performances of the turbojet engine can be improved.

The purpose of the invention is thus to at least partially overcome the needs described above and the disadvantages of embodiments according to prior art.

Another purpose of one of the aspects of the invention is an intermediate casing hub for an aircraft turbojet engine, comprising:

an inner annular shroud that will firstly delimit the exterior of a core engine flow space of a core engine gas flow in the turbojet engine, and secondly on the interior, the upstream part at least one inter-flow area, the inner annular shroud being provided with at least one primary air passage orifice, an outer annular shroud that will firstly delimit the interior of a fan flow space of a fan gas flow in the turbojet engine, and secondly the exterior of said at least one inter-flow area, the outer annular shroud being provided with at least one secondary air passage orifice, at least one variable bleed valve, comprising at least one mobile gate capable of drawing off air circulating in the core engine flow space through said at least one primary orifice and sending air thus drawn off to said at least one inter-flow area towards at least one corresponding discharge inlet orifice of at least one outlet pipe made of a composite material and shaped to allow an air passage from said at least one discharge inlet orifice to said at least one secondary orifice to send air drawn off through said at last one variable bleed valve into the fan flow space, characterised in that said at least one outlet pipe is fixed to the outer annular shroud at said at least one secondary orifice, at least one gasket for sealing against air and fire being installed between said at least one outlet pipe and the outer annular shroud, and in that said at least one outlet pipe made of a composite material comprises a draped composite wall composed of a plurality of plies impregnated with resin.

With the invention, the required seal against fire and air becomes possible at the interface between an outlet pipe of an intermediate casing hub of the aircraft turbojet engine and the outer shroud of the hub due to the good behaviour of the outlet pipe made of a composite material under fire and use of the fire-resistant gasket. In particular, the invention discloses a solution with sufficient mechanical strength in the casing of a fire risk and satisfying the conditions required by standard ISO 2685. Furthermore, the principle according to the invention avoids the use of a metallic type protection. Air and fire sealing functions are achieved through the presence of the gasket and manufacturing of a stack of impregnated plies of the outlet pipe made of a composite material. Thus, the invention can give a significant gain in terms of mass, allowing a reduction in the number of parts necessary to perform leak tightness and fire resistance functions. Furthermore, the invention makes it possible to supply an interface between the outlet pipe and the outer shroud that is ready to be installed.

The intermediate casing hub according to the invention may also comprise one or several of the following characteristics taken in isolation or in any technically possible combination.

In particular, the intermediate casing hub may comprise a downstream cross-plate connecting the inner and the outer annular shrouds, delimiting at least one intermediate space on the upstream side and at least one inter-flow space on the downstream side, the downstream cross-plate comprising said at least one discharge inlet orifice. Air circulating in the core engine flow space drawn off from said at least one primary orifice through said at least one mobile gate possibly being sent in said at least one intermediate space towards said at least one discharge inlet orifice, said at least one variable bleed valve comprising said at least one outlet pipe, located in said at least one inter-flow area and connecting said at least one discharge inlet orifice and said at least one secondary orifice, the air drawn off possibly circulating in said at least one intermediate space and being sent to the fan flow space.

Said at least one gasket for sealing against air and fire can be made particularly at least partly from silicone.

Said at least one gasket for sealing against air and fire can be composed of a superposition of different plies of fabric, particularly made of glass and/or ceramic.

The outer annular shroud may or may not comprise an annular boss. Similarly, said at least one outlet pipe may or may not comprise an annular joggle.

When the outer annular shroud comprises an annular boss and said at least one outlet pipe comprises an annular joggle, the attachment of said at least one outlet pipe to the outer annular shroud can be made through the annular boss and the annular joggle, particularly by screwing through the annular boss and the annular joggle.

The annular boss can extend entirely or partially around said at least one gasket for sealing against air and fire. Similarly, the annular joggle can extend entirely or partially around said at least one gasket for sealing against air and fire. Preferably, the assembly composed of the annular boss and the annular joggle can extend entirely around said at least one gasket for sealing against air and fire, forming a separation between said at least one gasket and said at least one inter-flow area.

As a variant, said at least one outlet pipe can comprise a partial annular joggle extending along at least two opposite edges of said at least one outlet pipe, particularly the upstream and downstream edges, the attachment of said at least one outlet pipe to the outer annular shroud being made through the partial annular joggle, particularly by screwing through the partial annular joggle to raise said composite wall, said at least one gasket being housed between said composite wall and the outer annular shroud. There is then no need for an annular boss on the outer annular shroud.

Furthermore, a check gate can be located at said at least one secondary orifice. Said at least one gasket for sealing against air and fire can be placed all around the control gate, the control gate being fixed to said at least one outlet pipe, particularly by screwing.

Moreover, said at least one gasket for sealing against air and fire can be located between the control gate and the assembly formed by the annular boss and the annular joggle.

Furthermore, the thickness of said at least one outlet pipe and/or the number of impregnated plies of said at least one outlet pipe can be chosen particularly as a function of the composite material(s) and/or the architecture of said at least one outlet pipe. This thickness and/or this number of impregnated plies are preferably sufficient to achieve the fire barrier function. Thus for example, said at least one outlet pipe can comprise a composite wall at least 1.5 mm and particularly 2 mm thick.

Furthermore, the composite wall of said at least one outlet pipe can comprise at least 3 impregnated plies, or particularly at least 4.

Preferably, said at least one outlet pipe can comprise a draped composite wall at least 2 mm thick and with at least 4 impregnated plies.

Furthermore, said at least one outlet pipe made of a composite material can be made particularly from a bismaleimide type of thermosetting resin, for example that marketed by the CYTEC company as reference CYCOM® 5250-4, and a laminate of carbon braids, particularly biaxial and/or triaxial.

The stacking strategy of impregnated plies forming the composite wall of said at least one outlet pipe advantageously directly influences the integrity of said at least one outlet pipe subject to a fire risk.

Furthermore, the purpose of another aspect of the invention is an intermediate casing for an aircraft turbojet engine, characterised in that it comprises a hub as defined above.

Furthermore, another purpose of another aspect of the invention is an aircraft turbojet engine, characterised in that it comprises an intermediate casing as defined above.

The intermediate casing hub, the intermediate casing and the aircraft turbojet engine according to the invention may include any of the characteristics mentioned in the description, taken in isolation or in any technically possible combination with other characteristics.

BRIEF DESCRIPTION OF THE DRAWINGS

The invention will be better understood after reading the following detailed description of a non-limitative example embodiment of it, and after studying the diagrammatic and partial figures in the appended drawing, on which.

In all these figures, identical references may denote identical or similar elements.

Moreover, the different parts shown on the figures are not necessarily all at the same scale, to make the figures more easily understandable.

DETAILED PRESENTATION OF A PARTICULAR EMBODIMENT

Note that throughout this description, the terms upstream and downstream should be understood with reference to a principal direction of normal gas flow (from upstream to downstream) for a turbojet engine 12. Furthermore, the radial axis of symmetry of the turbojet engine 12 is called the axis T of the turbojet engine 12. The axial direction of the turbojet engine 12 corresponds to the axis of rotation of the turbojet engine 12, that is the direction of the axis T of the turbojet engine 12. A radial direction of the turbojet engine 12 is a direction perpendicular to the axis T of the turbojet engine 12. Furthermore, unless mentioned otherwise, the adjectives and adverbs axial, radial, axially and radially are used with reference to the above-mentioned axial and radial directions. Furthermore, unless mentioned otherwise, the terms inner (or internal) and outer (external) are used with reference to a radial direction such that the inner part of an element is closer to the axis T of the turbojet engine 12 than the outer part of the same element.

Figure 1:
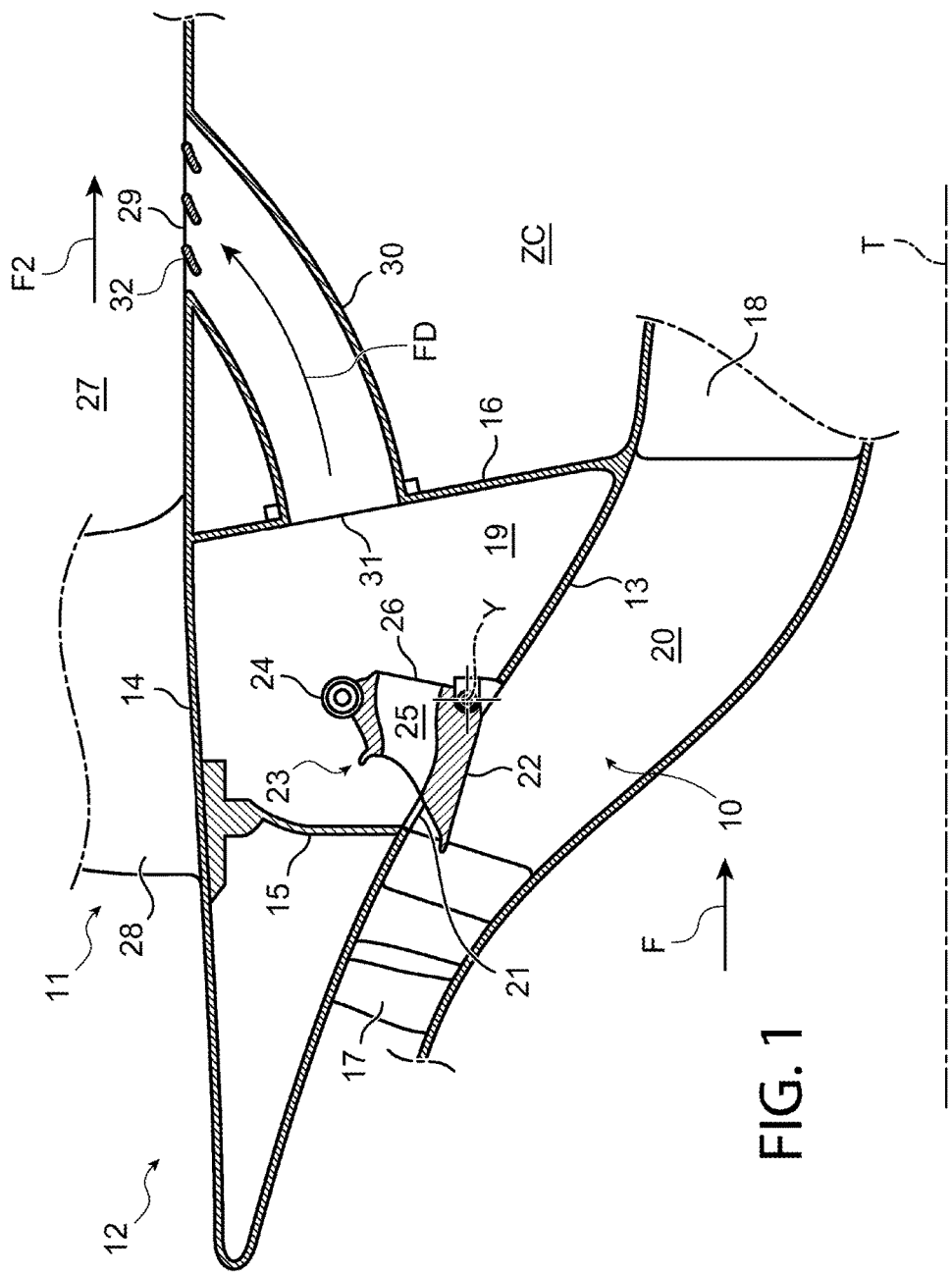
FIG. 1 shows an axial section of an example of an intermediate casing hub for an aircraft turbojet engine.

FIG. 1 has already been described in the part describing the state of prior art and the technical context of the invention.

Figure 2:
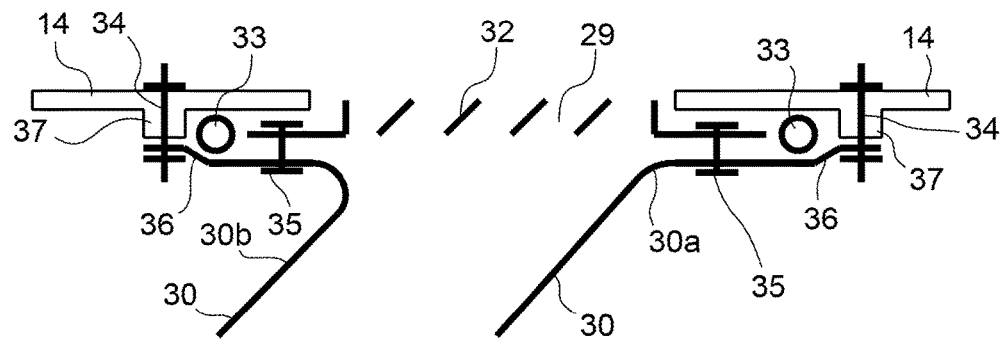
FIG. 2 is a partial diagrammatic axial section illustrating the principle of attachment of an outlet pipe to the outer shroud of an intermediate casing hub of an aircraft turbojet engine according to the invention, in other words manufacturing of the interface between the outlet pipe and the outer shroud of the hub.

FIG. 2 shows a partial diagrammatic axial section illustrating a principle of attachment of an outlet pipe 30 to the outer shroud 14 of a hub 10 of an intermediate casing 11 of an aircraft turbojet engine 12 according to one example embodiment of the invention, in other words manufacturing of the interface between the outlet pipe 30 and the outer shroud 14 of the hub 10.

Figure 3:
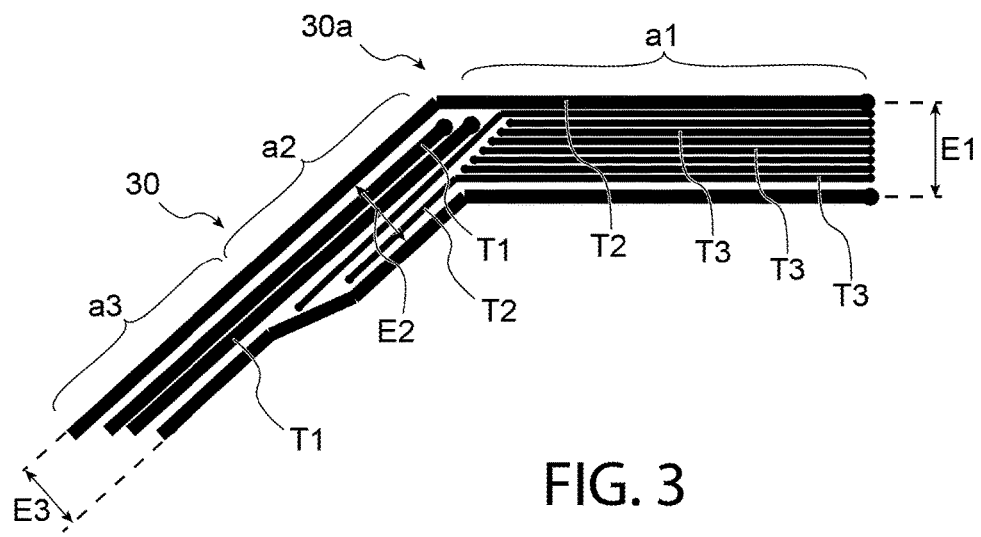
FIGS. 3 and 4 are partial diagrammatic axial sections illustrating a manufacturing principle of the upstream wall and the downstream wall respectively of the outlet pipe illustrated in FIG. 2.
Figure 4:
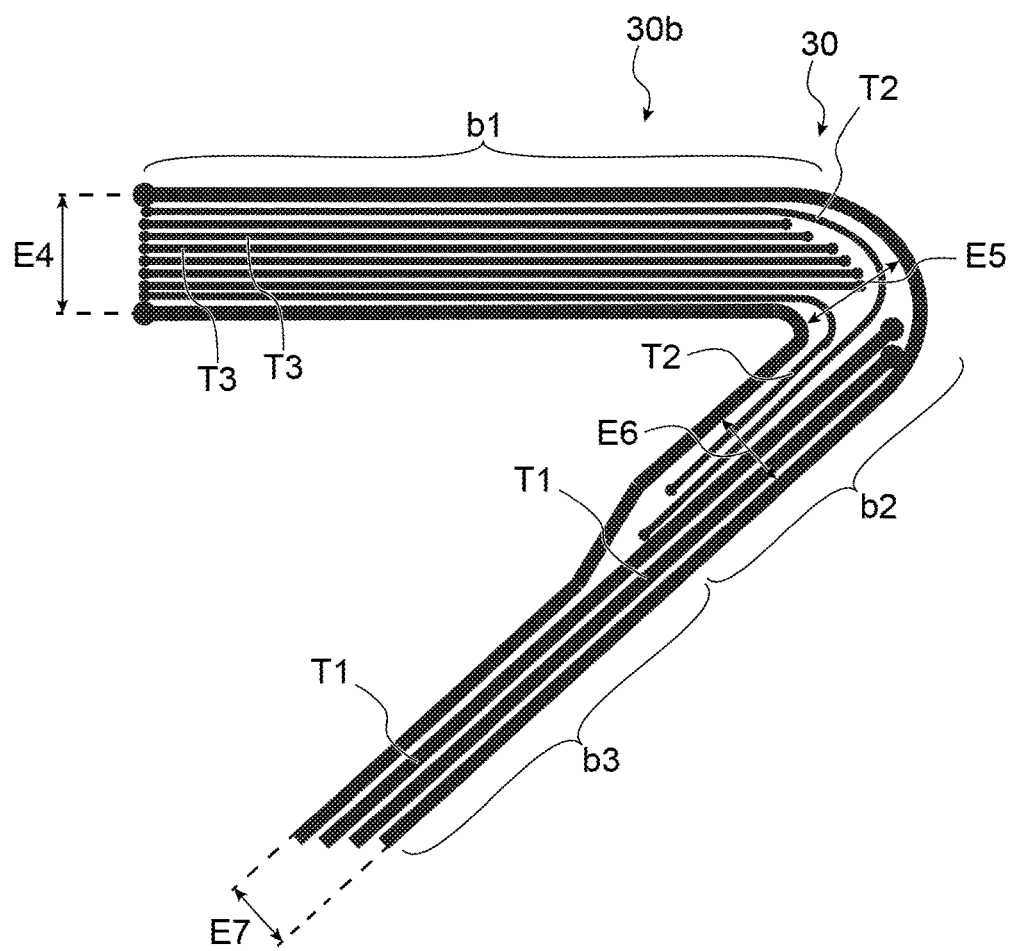

Furthermore, FIGS. 3 and 4 are partial diagrammatic axial sections illustrating a manufacturing principle of the upstream composite wall 30b and the downstream composite wall 30a respectively of the outlet pipe 30.

Figure 5:
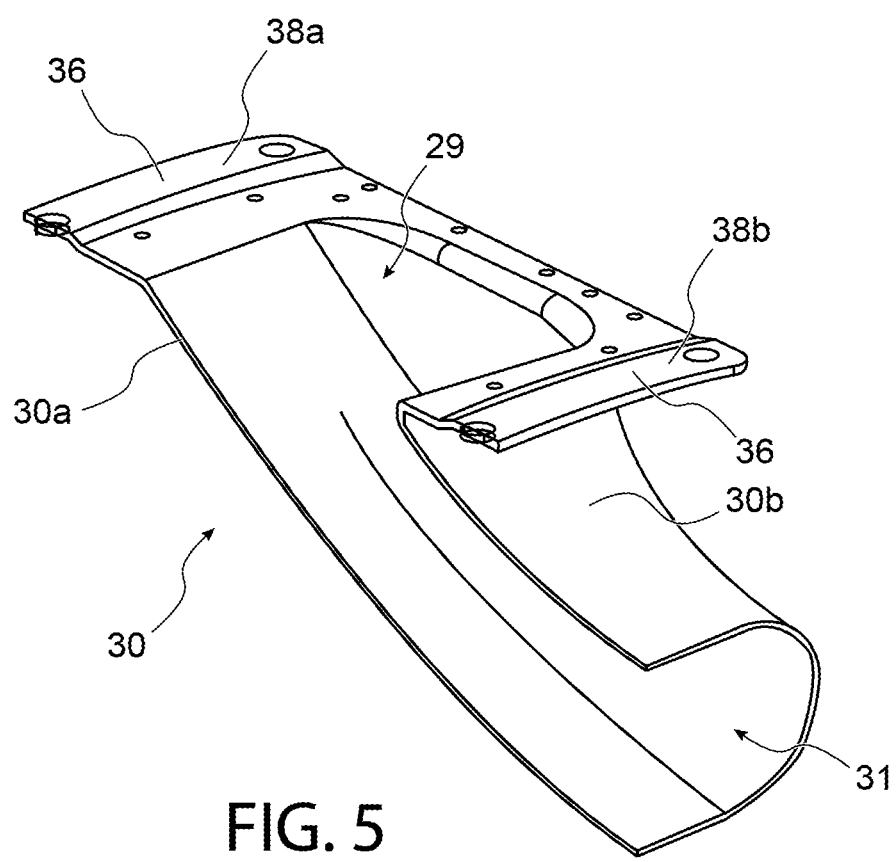
FIG. 5 is a partial perspective view illustrating an example variant embodiment of the outlet pipe of the intermediate casing hub of the aircraft turbojet engine according to the invention in FIGS. 2, 3 and 4.

Furthermore, FIG. 5 is a partial perspective view illustrating a variant embodiment of the outlet pipe 30 in FIGS. 2, 3 and 4.

The hub 10 of the intermediate casing 11 according to the invention, associated with FIGS. 2, 3 and 4 described below, can in particular be of the same type as that described above with reference to FIG. 1. Also, for information about the parts not shown on FIGS. 2, 3 and 4 the above description of FIG. 1 should be referred to.

As thus described above, the discharge conduit 30 is located in the inter-flow area ZC and connects the discharge inlet orifice 31 and the secondary orifice 29.

The outlet pipe 30 can then draw off, through the discharge inlet orifice 31, air circulating in the intermediate space 19 and carry the air thus drawn off to the fan flow space 27.

According to the invention, the outlet pipe 30 is fixed to the outer annular shroud 14 at the secondary orifice 29. Furthermore, a gasket 33 gasket for sealing against air and fire is located between the outlet pipe 30 and the outer annular shroud 14.

More precisely, as can be seen on FIG. 2, the outer shell 14 comprises an annular boss 37 and the outlet pipe 30 comprises an annular joggle 36. The attachment of the outlet pipe 30 to the outer shell 14 is then made by screwing 34 through the annular boss 37 and the annular joggle 36.

Furthermore, advantageously, the assembly composed of the annular boss 37 and the annular joggle 36 extends all around the gasket 33, forming a separation between the gasket 33 and the inter-flow area ZC.

Furthermore, there is a control gate 32 located at the secondary orifice 29. The gasket 33 is then placed all around the control gate 32, that is fixed to the outlet pipe 30 by screwing 35. Thus, the gasket 33 is located between the control gate 32 and the assembly formed by the annular boss 37 and the annular joggle 36.

For example, the gasket 33 can be made at least partly from silicone. In particular, it may include a superposition of different plies of fabrics, particularly glass fibre and/or ceramic.

Furthermore, the discharge pipe 30 is made of a composite material. It comprises an upstream composite wall 30b and a downstream composite wall 30a. According to the invention, the upstream wall 30b and the downstream wall 30a are draped, in other words they are obtained by laying up a plurality of plies impregnated with resin, these plies including particularly biaxial or triaxial carbon braids, and the resin being of the bismaleimide type.

The thickness of the outlet pipe 30 and the number of impregnated plies in the outlet pipe 30 can be chosen as a function of the composite materials and the architecture of the outlet pipe 30.

As can be seen on FIG. 3, the downstream composite wall 30a of the outlet pipe 30 comprises three successive portions a1, a2 and a3 in particular.

The first portion a1 comprises for example two large diameter biaxial carbon braids T2, with a thickness of about 0.55 mm, and for example at least six, or even eight, flat carbon triaxial braids T3 with a thickness of about 0.25 mm. Consequently, the thickness E1 of the first portion a1 is at least about 2.6 mm, or even at least about 3.1 mm.

Furthermore, the second portion a2 comprises for example two large diameter biaxial carbon braids T2, with a thickness of about 0.55 mm, and for example two small diameter carbon biaxial braids T1 with a thickness of about 0.55 mm. Consequently, the thickness E2 of the second portion a2 is about 2.7 mm.

Furthermore, the third portion a3 comprises for example two large diameter biaxial carbon braids T2, two small diameter biaxial carbon braids T1 with a thickness of about 0.55 mm. Consequently, the thickness E3 of the third portion a3 is about 2.2 mm.

Moreover, as can be seen on FIG. 4, the upstream composite wall 30b of the outlet pipe 30 also comprises three successive portions b1, b2 and b3 in particular.

The first portion b1 comprises for example two large diameter biaxial carbon braids T2, with a thickness of about 0.55 mm, and for example at least six, or even eight, flat carbon triaxial braids T3 with a thickness of about 0.25 mm. Consequently, the thickness E4 of the first portion b1 is at least about 2.6 mm, or even at least about 3.1 mm, or even at least about 3.8 mm.

Furthermore, the second portion b2 comprises for example two large diameter biaxial carbon braids T2, with a thickness of about 0.55 mm, and for example two small diameter biaxial carbon braids T1 with a thickness of about 0.55 mm. Consequently, the thickness E6 of the second portion b2 is about 2.7 mm.

Furthermore, the third portion b3 comprises for example two large diameter biaxial carbon braids T2, two small diameter biaxial carbon braids T1 with a thickness of about 0.55 mm. Consequently, the thickness E7 of the third portion b3 is about 2.2 mm.

Finally, the thickness E5 of the upstream composite wall 30b at the bend may for example be about 1.6 mm.

Furthermore, FIG. 5 contains a partial perspective view illustrating a variant embodiment of the outlet pipe 30 from the hub 10 of the intermediate casing 11 according to the invention described above with reference to FIGS. 2, 3 and 4.

In this example, the outer annular shroud 14 (not shown on FIG. 5) does not have an annular boss. The outlet pipe 30 thus couples to the outer annular shroud 14 without any step at the surface.

More precisely, to achieve this, the outlet pipe 30 comprises an annular joggle 36 that is only partial. This joggle extends only on the two opposite edges, the upstream edge 38b and downstream edge 38a of the outlet pipe 30.

The attachment of the outlet pipe 30 to the outer annular shroud 14 can be made for example using the partial annular joggle 36 by screwing through the partial annular joggle 36 to raise the composite walls 30a, 30b. The gasket 33, necessary to prevent flames from passing along the sides of the pipe 30, is thus housed between the composite walls 30a, 30b and the outer annular shroud 14.

Obviously, the invention is not limited to the example embodiment that has just been described. An expert in the subject can make various modifications to it.

What is claimed is:

1. Hub of intermediate casing for aircraft turbojet engine, comprising:

an inner annular shroud delimiting an exterior of a core engine flow space of a core engine gas flow in the turbojet engine, and an interior of an upstream part of at least one inter-flow area, the inner annular shroud being provided with at least one primary air passage orifice, an outer annular shroud that will firstly delimit an interior of a fan flow space of a fan gas flow in the turbojet engine, and secondly delimit an exterior of said at least one inter-flow area, the outer annular shroud being provided with at least one secondary air passage orifice, at least one variable bleed valve, comprising at least one mobile gate capable of drawing off air circulating in the core engine flow space through said at least one primary orifice and sending air thus drawn off to said at least one inter-flow area towards at least one corresponding discharge inlet orifice of at least one outlet pipe of the hub of the intermediate case made of a composite material and shaped to allow an air passage from said at least one discharge inlet orifice to said at least one secondary orifice to send air drawn off through said at last one variable bleed valve into the fan flow space, wherein said at least one outlet pipe is fixed to the outer annular shroud at said at least one secondary orifice, at least one gasket for sealing against air and fire being installed between said at least one outlet pipe and the outer annular shroud and wherein said at least one outlet pipe made of a composite material comprises a draped composite wall composed of a plurality of plies impregnated with resin.

2. Intermediate casing hub according to claim 1, comprising the following:

a downstream cross-plate connecting the inner annular shroud and the outer annular shroud, delimiting at least one intermediate space on an upstream side and said at least one inter-flow area on a downstream side, the downstream cross-plate comprising said at least one discharge inlet orifice, wherein the air is drawn up from said at least one primary orifice, through said at least one mobile gate to said at least one intermediate space towards said at least one discharge inlet orifice, wherein said at least one variable bleed valve comprises said at least one outlet pipe, located in said at least one inter-flow area and connecting said at least one discharge inlet orifice and said at least one secondary orifice, and wherein the air drawn off circulating in said at least one intermediate space is sent to the fan flow space.

3. Intermediate casing hub according to claim 1, wherein said at least one gasket for sealing against air and fire is at least partly made from silicone.

4. Intermediate casing hub according to claim 1, wherein the outer annular shroud comprises an annular boss and wherein said at least one outlet pipe comprises an annular joggle, wherein an attachment of said at least one outlet pipe to the outer annular shroud is made through the annular boss and the annular joggle, by screwing through the annular boss and the annular joggle.

5. Intermediate casing hub according to claim 4, wherein an assembly composed of the annular boss and the annular joggle extends entirely around said at least one gasket for sealing against air and fire, forming a separation between said at least one gasket and said at least one inter-flow area.

6. Intermediate casing hub according to claim 1, wherein said at least one outlet pipe comprises a partial annular joggle extending along at least two opposite edges of said at least one outlet pipe, wherein an attachment of said at least one outlet pipe to the outer annular shroud is made through the partial annular joggle, by screwing through the partial annular joggle to raise said composite wall, wherein said at least one gasket is housed between said composite wall and the outer annular shroud.

7. Intermediate casing hub according to claim 6, wherein the outer annular shroud does not have an annular boss.

8. Intermediate casing hub according to claim 1, further comprising a control gate at said at least one secondary orifice, wherein said at least one gasket for sealing against air and fire is placed all around the control gate, and the control gate is fixed to at least one outlet pipe.

9. Intermediate casing hub according to claim 8, wherein said at least one gasket for sealing against air and fire is located between the control gate and an assembly formed by an annular boss and an annular joggle.

10. Intermediate casing hub according to claim 1, wherein said at least one outlet pipe comprises a composite wall with thickness equal to at least 1.5 mm.

11. Intermediate casing hub according to claim 1, wherein the composite wall of said at least one outlet pipe comprises at least 3 impregnated plies.

12. Intermediate casing for aircraft turbojet engine comprising a hub according to claim 1.

13. Aircraft turbojet engine, comprising an intermediate casing according to claim 12.

* * * * *